(12) United States Patent
Vaughan

(10) Patent No.: US 7,036,295 B1
(45) Date of Patent: May 2, 2006

(54) AQUATIC GROWTH HARVESTER

(76) Inventor: James A. Vaughan, 3810 W. Flamingo Rd., Pahrump, NV (US) 89048

( * ) Notice: Subject to any disclaimer, the term of this patent is extended or adjusted under 35 U.S.C. 154(b) by 0 days.

(21) Appl. No.: 11/091,207

(22) Filed: Mar. 28, 2005

(51) Int. Cl.
*A01D 44/00* (2006.01)

(52) U.S. Cl. ............................................ 56/9; 56/327.1
(58) Field of Classification Search ....................... 56/9, 56/8, 327.1
See application file for complete search history.

(56) References Cited

U.S. PATENT DOCUMENTS

| | | | |
|---|---|---|---|
| 2,677,926 A | * | 5/1954 | Washbourne et al. ............. 56/8 |
| 3,363,596 A | * | 1/1968 | Grinwald ...................... 114/32 |
| 3,468,106 A | * | 9/1969 | Hayes et al. ...................... 56/9 |
| 3,587,216 A | * | 6/1971 | Wedgeworth et al. ..... 56/327.1 |
| 3,637,080 A | * | 1/1972 | Markel ........................ 210/769 |
| 4,464,851 A | * | 8/1984 | Collier ......................... 37/309 |
| 4,696,149 A | | 9/1987 | Hawk |
| 4,813,377 A | | 3/1989 | Riche |
| 4,944,108 A | * | 7/1990 | George et al. ................. 43/6.5 |
| 5,083,417 A | * | 1/1992 | Jeronimidis et al. .............. 56/9 |
| 5,450,713 A | | 9/1995 | Rohde |
| 5,934,054 A | * | 8/1999 | Landeis ....................... 56/14.3 |

FOREIGN PATENT DOCUMENTS

WO   WO 9901021 A1 *  1/1999

* cited by examiner

*Primary Examiner*—Meredith C. Petravick
(74) *Attorney, Agent, or Firm*—Gene Scott & Patent Law & Venture Group.

(57) ABSTRACT

A deck slotted into a left and a right deck halves in spaced apart positions so as to provide a slot therebetween. On each of the deck halves a pair of drums are mounted for rotation. Around each of the pairs of drums a rubber belt is engaged so that the rubber belts are in spaced apart adjacency. A motor is linked with at least one of the drums for rotating at least one of the rubber belts. A pair of rigid wires extends divergently forward from a forward end of the deck. A chamber is positioned rearwardly of the deck in a position for accepting aquatic growth moving between the rubber belts and in the slot in rearward motion. A hose is engaged rearwardly on the chamber for drawing the growth by suction into the hose.

9 Claims, 4 Drawing Sheets

AQUATIC GROWTH HARVESTER

RELATED APPLICATIONS

This application relates to a prior filed provisional patent application having Ser. No. 60/325,635, filed Sep. 27, 2001 and entitled Aquatic Growth Harvester, now abandoned.

BACKGROUND OF THE INVENTION

1. Field of the Invention

This invention relates generally to harvesting machines and more particularly to a harvesting machine for harvesting plant life from the bottom of bodies of fresh water such as lakes and rivers.

2. Description of Problem

Eurasian Watermilfoil (*myriophyllum spicatum*) was accidentally introduced into North America from Europe in the 1940s. It most likely entered waters in eastern North America when aquarium owners released the contents of their aquariums into local lakes. It flourished there and began spreading westward by clinging to recreational boats. It is now present in waters across North America. Watermilfoil's explosive growth has choked many bodies of water, crowding out native plants and fish. It also tends to spoil them for boating and other water sports activities. This plant spreads naturally through stem fragments and underground runners. Fragments transported to new areas by watercraft or on waves and currents help to spread the growth. It continues to be a problem in lakes, ponds, and streams throughout the United States and Canada.

3. Description of Related Art

The following art defines the present state of this field and each disclosure is hereby incorporated herein by reference:

Hawk, U.S. Pat. No. 4,696,149 discloses a method for removal of aquatic weeds by first dragging the bottom of a lake with a horizontal bar to loosen the weeds from the bottom. The uprooted and broken weed stalks are permitted to float to the surface of the lake. The weeds are scooped from the water by a mesh scoop capable of being carried to a dumping area and emptied. The method is carried out by a self-propelled hull having a boom pivotally attached to a forward end thereof. The boom is adapted to receive various implements on its free end. One such implement is a horizontal drag bar with downwardly depending tines to drag the lake bottom and another of the implements is the wire mesh scoop mentioned above. The tines of the first implement each preferably include at least a portion that is angled forwardly, so that when the boom is lowered sufficiently to meet the lake bottom the angled portion of the tine if substantially orthogonal to the lake bottom. The tines preferably are at least partially embedded in the bottom and loosen the root systems of deeply-rooted aquatic weeds. The scoop is pivotally mounted on the boom so that it can be moved by gravity to a dump position that permits gravity to act on the weed stalks and empty the scoop.

Riche, U.S. Pat. No. 4,813,377, discloses a harvester propelled forward through a body of shallow water, the water moves over the bottom of the harvester in roughly laminar flow (depth can be up to top of sides) and contacts apex of the vee gutter, and is deflected outward causing an increase in velocity to the constriction points where the ends of the vee gutter legs and curved corner plates coincide in a vertical plane. The lowered static pressure due to increased velocity at trailing edges of vee gutter legs propels the stream upward into a stagnated area behind the apex forming a vortex of counter-clockwise flow to port and clockwise flow to starboard which casts any entrained product such as crayfish into the stagnation area, thereby trapping and preventing any damage to the creatures.

Rohde, et al, U.S. Pat. No. 5,450,713 discloses a device for removing undesirable aquatic vegetation from lake bottoms. The device includes a weed trap and an elongated handle pivotally mounted thereto. The trap is formed of mesh, screen, etc. and includes at least one flat side and an open top. A cutting bar is disposed along a top edge of the flat side. A releasable latch is provided to selectively latch the handle to the trap.

Our prior art search with abstracts described above teaches several apparatus for clearing underwater brush. However, the prior art fails to teach an apparatus that is able to clamp onto and pull a shock of collected underwater weeds and, using suction, move the weeds to a collection bin afloat. The present invention fulfills these needs and provides further related advantages as described in the following summary.

SUMMARY OF THE INVENTION

The present invention teaches certain benefits in construction and use which give rise to the objectives described below.

The present invention, an aquatic growth harvester, is an apparatus that pulls Watermilfoil from a relatively shallow water bed, and at the same time, removes debris created during this process, which helps to prevent regeneration. It is propelled by drawing water under suction into a hose or pipe causing the harvester to move along a water bed in generally horizontal linear motion. It is typically engaged and operates from a barge or ship. The barge positions the harvester on the water bed using mechanical means and provides suction to move it along a desired path, back and forth much like a crop harvester moves back and forth through a field of wheat or corn.

The apparatus has a flat deck slotted into a left and a right halves. Each of the deck halves provides a pair of drums about which a rubber belt is mounted. One of the drums is driven by a hydraulic motor which causes the rubber belt attached thereto to rotate about its pair of drums. The opposing belt is caused to rotate as well by friction as plants are taken in between the belts and moved from a forward end of the deck to a discharge point at the rear of the deck.

On the forward end of the deck are mounted a pair of rigid wires extending divergently forward. These wires tend to herd plant growth between them and into the slot between the left and the right sides of the deck so that it is pulled by the belts until being uprooted. The plants then are moved into a chamber by the force of water flow, and upon entering the chamber, it is forced into and flows upwardly in the hose to the surface where it is discharged into self-draining storage containers on the barge.

A primary objective of the present invention is to provide an apparatus and method of use of such apparatus that yields advantages not taught by the prior art.

Another objective of the invention is to provide an apparatus able to uproot underwater growth and to move such growth to a depository on the surface of a shallow body of water.

A further objective of the invention is to enable an operator to view such an underwater operation.

A still further objective of the invention is to provide an apparatus that may be mounted in a side-by-side plurality for clearing a wide swath of underwater brush in a single pass.

Other features and advantages of the embodiments of the present invention will become apparent from the following more detailed description, taken in conjunction with the accompanying drawings, which illustrate, by way of example, the principles of at least one of the possible embodiments of the invention.

BRIEF DESCRIPTION OF THE DRAWINGS

The accompanying drawings illustrate at least one of the best mode embodiments of the present invention. In such drawings.

DETAILED DESCRIPTION OF THE INVENTION

The above described drawing figures illustrate the present invention in at least one of its preferred, best mode embodiments, which is further defined in detail in the following description. Those having ordinary skill in the art may be able to make alterations and modifications in the present invention without departing from its spirit and scope. Therefore, it must be understood that the illustrated embodiments have been set forth only for the purposes of example and that they should not be taken as limiting the invention as defined in the following.

Figure 1:
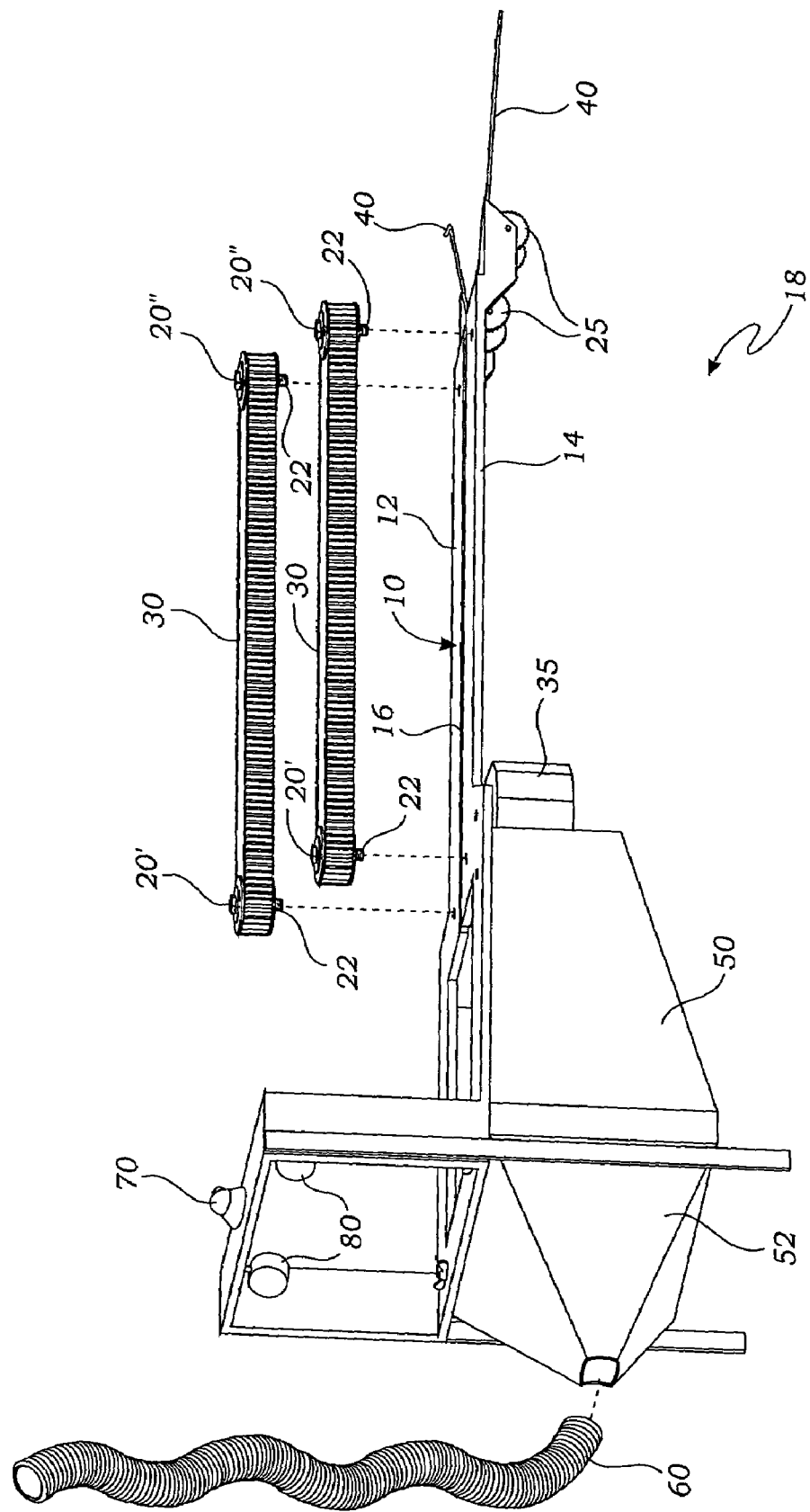
FIG. 1 is a perspective view of one embodiment of the present invention shown with several parts spaced apart from their mountings.

The present invention apparatus in a preferred embodiment provides a deck 10 which is slotted into a left 12 and a right 14 deck halves in spaced apart positions thereby establishing a slot 16 between them, as shown in FIG. 1. On each of the deck halves 12 and 14, a pair of drums 20' and 20" are mounted for rotation, i.e., each of the drums 20' and 20", which may be identical, are able to rotate about an axle 22 engaged with the deck 10. Around each of the pairs of drums 20' and 20", a rubber belt 30 is engaged so that the rubber belts 30 are in spaced apart adjacency. A motor 35, preferably a hydraulic motor, is linked with at least one of the drums 20', 20" for rotating at least one of the rubber belts 30. When growth is drawn into the space between the rubber belts 30, even if only one of the belts 30 is driven, the other of the belts 30 is also caused to rotate by friction.

A pair of rigid wires 40 extends divergently forward from a forward end 18 of the deck 10. A chamber 50 is positioned and attached rearwardly of the deck 10 in a position for accepting aquatic growth moving between the rubber belts 30 within the slot 16 in rearward motion. A hose 60 is engaged rearwardly to the chamber 50 for drawing the growth through the chamber 50 and into the hose 60 by suction which is applied at an upper end of the hose 60. The means for applying suction to the hose 60 is not shown in the figures but may be any suction developing machine such as a pump well known in the art.

Preferably, the chamber 50 provides a funnel-like rearward portion 52 and a lower end of the hose 60 is joined with the rearward portion 52 for enabling the aquatic growth that is drawn into the chamber 50 to converge into the hose 60 so that it is able to be drawn to the surface of the body of water 5 by pumping action suction causing water to move rapidly through the chamber 50 and hose 60 carrying the aquatic growth with it.

Preferably, a rearwardly mounted video camera 70 and lamp or lamps 80 are positioned for viewing the forward portion 18 of the apparatus.

Figure 5:
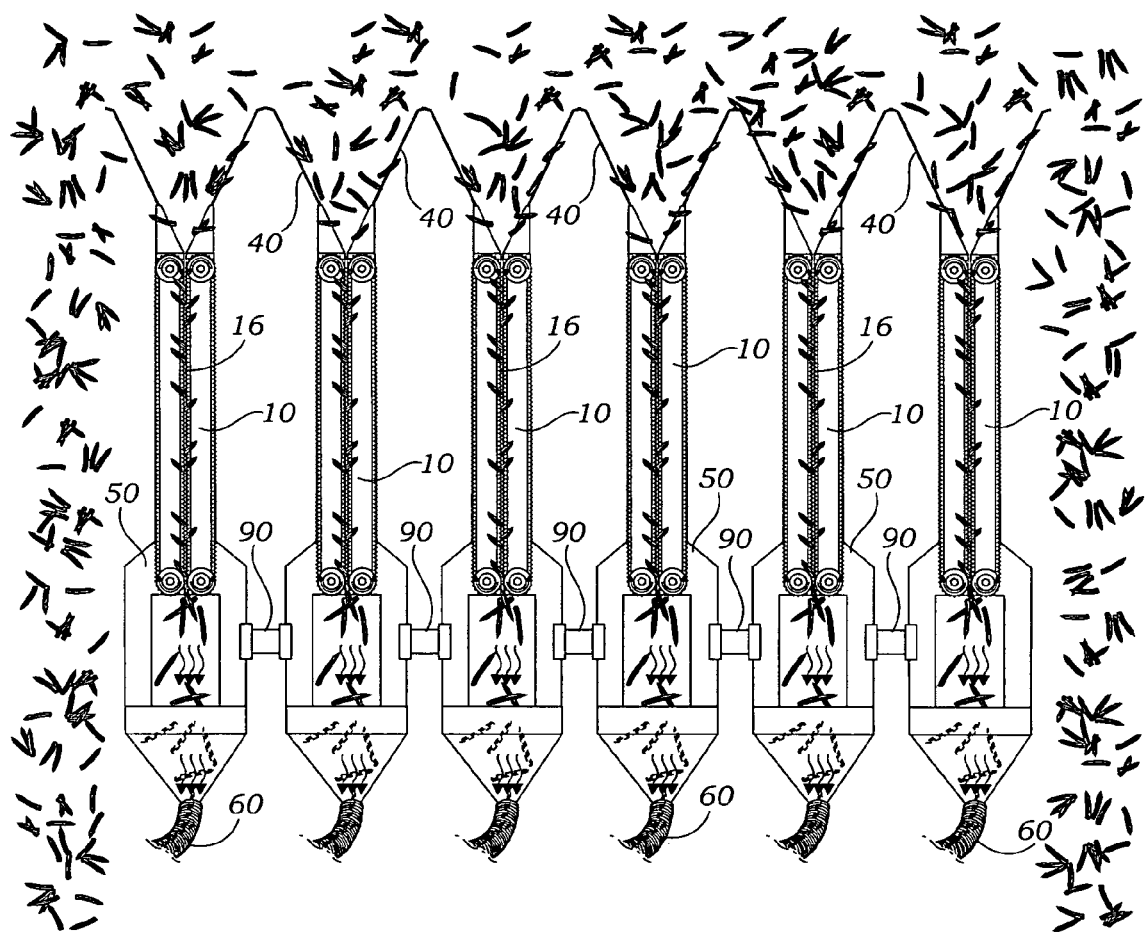
FIG. 5 is a plan view similar to that of FIG. 4 showing a plurality of the apparatus of the present invention at work harvesting underwater growth.

In a further embodiment of the present invention a plurality of the apparatus as described above and shown in FIGS. 1–4, referred to now as a harvesting assembly, may be aligned in parallel and joined by a joining member 90 so as to move through the water together as a single entity as shown in FIG. 5. Such a joining member 90 may be any common hardware. Alternatively, the decks 10 of the harvesting assemblies shown in FIG. 5 may be formed as a single deck (not shown) with plural spaced apart slots 16, and the chambers 50, likewise, may be a single elongated chamber (not shown). When such plural harvesting assemblies are used in this manner the rigid wires 40 of the several units are arrange in side-by-side adjacency so that all of the stalks of the growth to be harvested are able to be gathered into one or another of the assemblies. In this manner a wide swath of growth may be taken in a single pass.

Figure 2:
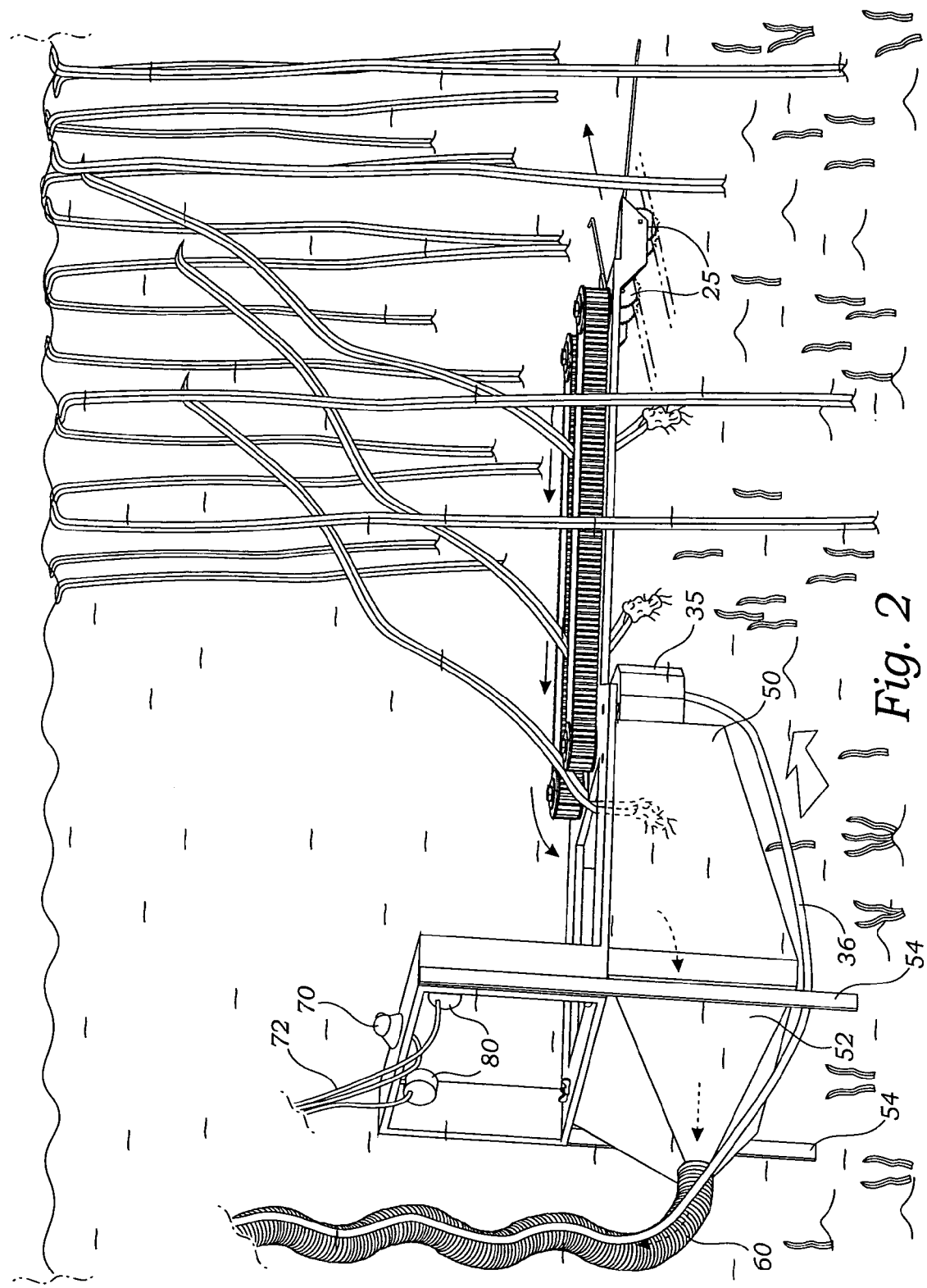
FIG. 2 is a similar perspective view with the apparatus shown in operation.
Figure 3:
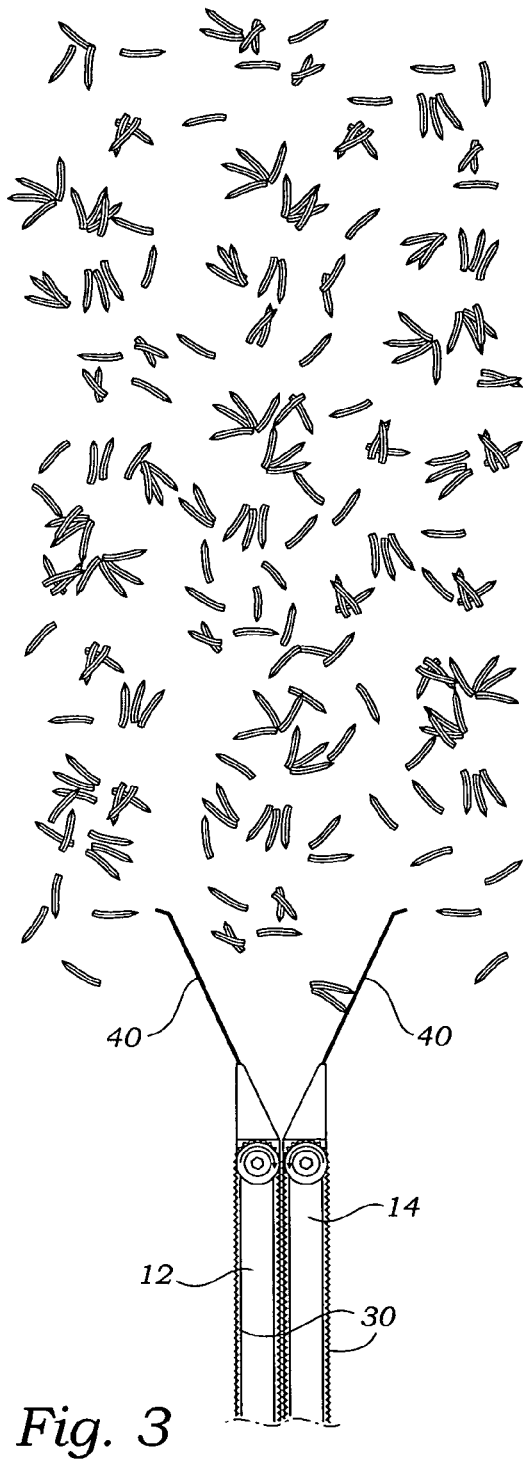
FIG. 3 is a plan view showing a forward portion of the present invention as it approaches a patch of underwater growth.
Figure 4:
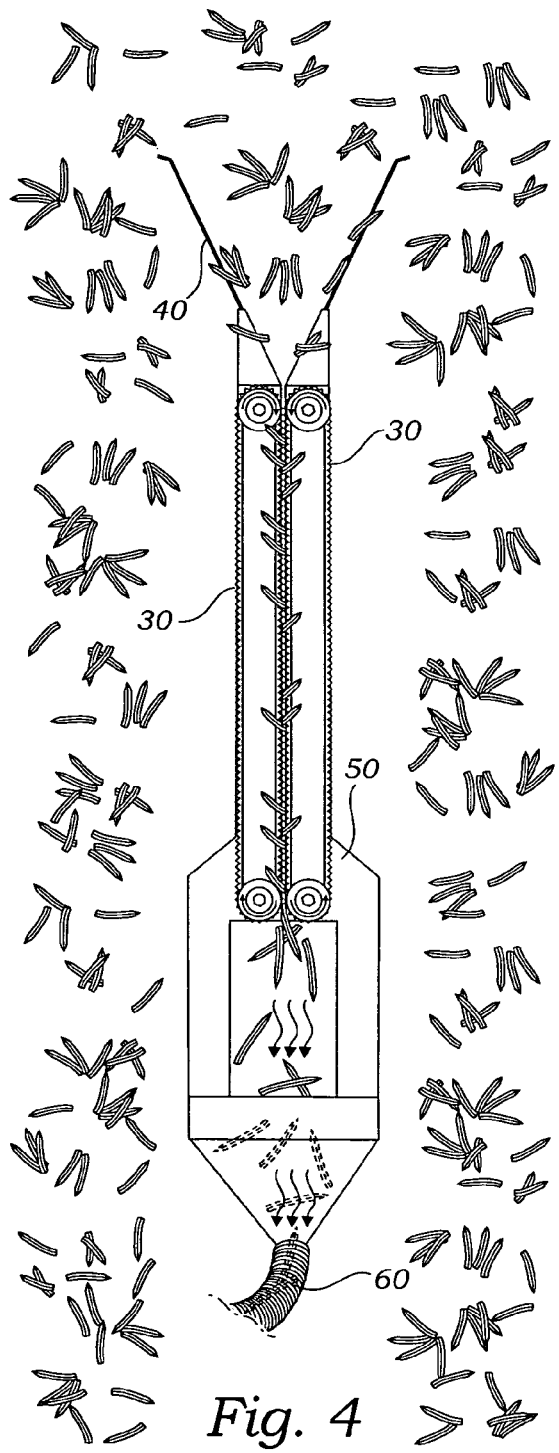
FIG. 4 is a plan view similar to that of FIG. 3 showing the result of operation of the present apparatus.

The operation of the present invention is best understood as illustrated in FIG. 2. In this figure we see that the harvesting assembly apparatus is placed on the bed of a body of water such as a pond, a stream, a river or a lake, where undesired aquatic growth appears. The apparatus rests on the water bed on a pair of rear legs 54 and two or more frontal wheels 25. The wheels 25 are rotationally engaged at the forward end 18 of platform 10. As water is drawn into hose 60 the reaction force moves the apparatus forward along the water bed. Wires 40 herd the aquatic growth toward the forward end 18 of the platform 10 and into contact with the rotating belts 30. The belts are preferably pleated so as to grip the aquatic growth plants by their stalks and as the apparatus moves forward, the plants are uprooted and delivered into the chamber 50. It is noted that the motor 35 is placed to one side of the slot 16 and the front end of the chamber 50 is also slotted so that the uprooted plants are able to easily enter the chamber 50. It is also noted that the water flow through the chamber 50 and the hose 60 is quite vigorous so that the plants are carried through the chamber 50 and into the hose 60. FIG. 2 also shows a hydraulic line 36 for operating the hydraulic motor 35, and an electrical cable 72 for operating the video camera 70 and the lights 80.

Clearly, it is understood from the above description that a barge, raft, boat or other floating device is needed as a platform in support of the present invention. Such a floating support is required to have an electric generator or other electric power supply, a high speed water pump, an hydraulic pump, a receptacle for receiving the harvest, and an articulating arm or similar device for placement of the apparatus and for retrieving it when the harvesting operation is completed. It should be realized that the present invention apparatus is able to harvest aquatic growth in bodies of water that may be quite deep depending only on the length of the hose 30 and other attachments.

The enablements described in detail above are considered novel over the prior art of record and are considered critical to the operation of at least one aspect of one best mode embodiment of the instant invention and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or elements of the embodiments of the herein described invention and its related embodiments not described are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the invention and its various embodiments or that a single element may be substituted for two or more elements in a claim.

Changes from the claimed subject matter as viewed by a person with ordinary skill in the art, now known or later devised, are expressly contemplated as being equivalents within the scope of the invention and its various embodiments. Therefore, obvious substitutions now or later known to one with ordinary skill in the art are defined to be within the scope of the defined elements. The invention and its various embodiments are thus to be understood to include what is specifically illustrated and described above, what is conceptually equivalent, what can be obviously substituted, and also what essentially incorporates the essential idea of the invention.

While the invention has been described with reference to at least one preferred embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. An apparatus for harvesting aquatic growth comprises: a deck slotted into a left and a right deck halves in spaced apart positions so as to provide a slot therebetween; on each of the deck halves a pair of drums mounted for rotation; around each of the pairs of drums a rubber belt engaged so that the rubber belts are in spaced apart adjacency; a motor linked with at least one of the drums for rotating at least one of the rubber belts; a pair of rigid wires extending divergently forward from a forward end of the deck; a chamber positioned rearwardly of the deck in a position for accepting aquatic growth moving between the rubber belts and in the slot in rearward motion; and a hose engaged rearwardly on the chamber for drawing the growth thereinto by suction within the hose.

2. The apparatus of claim 1 wherein the chamber provides a funnel-shaped rearward portion joined with the hose enabling the growth drawn into the chamber to converge into the hose.

3. The apparatus of claim 1 further comprising a rearwardly mounted video camera positioned for viewing a forward portion of the apparatus.

4. The apparatus of claim 3 further comprising a rearwardly mounted lamp positioned for illuminating a forward portion of the apparatus.

5. An apparatus for harvesting aquatic growth comprises: a plurality of harvesting assemblies, each of the harvesting assemblies providing a deck slotted into a left and a right deck halves in spaced apart positions; on each of the deck halves a pair of drums mounted for rotation; around each of the pairs of drums a rubber belt engaged so that the rubber belts are in spaced apart adjacency; a motor linked with at least one of the drums for rotating at least one of the rubber belts; a pair of rigid wires extending divergently forward from a forward end of the deck; a chamber positioned rearwardly of the deck in a position for accepting aquatic growth moving between the rubber belts in a rearward motion; and a hose engaged rearwardly on the chamber for drawing the growth thereinto by suction within the hose; the harvesting assemblies positioned in side-by-side mutual engagement such that the decks are aligned in parallel and at least one of the rigid wires of at least one of the assemblies is in near contact with one of the rigid wires of another one of the assemblies.

6. The apparatus of claim 5 wherein in at least one of the harvesting assemblies the chamber provides a funnel-shaped rearward portion joined with the hose enabling the growth drawn into the chamber to converge into the hose.

7. The apparatus of claim 5 wherein at least one of the harvesting assemblies further comprises a rearwardly mounted video camera positioned for viewing a forward portion of the at least one of the harvesting assemblies.

8. The apparatus of claim 7 wherein at least one of the harvesting assemblies further comprises a rearwardly mounted lamp positioned for viewing a forward portion or the at least one of the harvesting assemblies.

9. An apparatus for harvesting aquatic growth comprises: a deck having a pair of rotating belts for drawing the aquatic growth therebetween, the belts each supported by a set of drums having vertically oriented axles engaged with the deck; a motor driving at least one of the belts extending forward of the deck, a means for herding the aquatic growth toward the belts; a chamber positioned for receiving the aquatic growth from the belts; and a hose engaged with the chamber for receiving the aquatic growth from the chamber.

* * * * *